US008626852B2

(12) United States Patent
Keohane et al.

(10) Patent No.: US 8,626,852 B2
(45) Date of Patent: Jan. 7, 2014

(54) EMAIL THREAD MONITORING AND AUTOMATIC FORWARDING OF RELATED EMAIL MESSAGES

(75) Inventors: Susann M. Keohane, Austin, TX (US); Gerald F. McBrearty, Austin, TX (US); Shawn P. Mullen, Buda, TX (US); Jessica K. Murillo, Hutto, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 12/915,937

(22) Filed: Oct. 29, 2010

(65) Prior Publication Data
US 2012/0110092 A1 May 3, 2012

(51) Int. Cl.
*G06F 15/16* (2006.01)

(52) U.S. Cl.
USPC ........... 709/206; 709/207; 709/204; 709/205; 709/203; 713/152; 713/400

(58) Field of Classification Search
USPC .......................... 709/219, 204–207, 227, 217
See application file for complete search history.

(56) References Cited

U.S. PATENT DOCUMENTS

| | | | | |
|---|---|---|---|---|
| 6,965,919 B1 * | 11/2005 | Woods et al. | | 709/206 |
| 7,020,688 B2 * | 3/2006 | Sykes, Jr. | | 709/206 |
| 7,149,778 B1 * | 12/2006 | Patel et al. | | 709/206 |
| 7,359,948 B2 * | 4/2008 | Ralston et al. | | 709/206 |
| 7,370,277 B1 * | 5/2008 | Canfield et al. | | 715/752 |
| 7,421,690 B2 * | 9/2008 | Forstall et al. | | 718/100 |
| 7,609,820 B2 * | 10/2009 | Bedingfield, Sr. | | 379/88.12 |
| 7,900,148 B1 * | 3/2011 | Canfield et al. | | 715/752 |
| 2002/0035607 A1 * | 3/2002 | Checkoway et al. | | 709/206 |
| 2002/0065784 A1 * | 5/2002 | Ranzini et al. | | 705/64 |
| 2002/0129108 A1 * | 9/2002 | Sykes, Jr. | | 709/206 |
| 2002/0138586 A1 * | 9/2002 | Paleiov et al. | | 709/207 |

(Continued)

OTHER PUBLICATIONS

"Bells & Whistles for Outlook: automatically CC or BCC on every email", DS Development Software http://www.emailaddressmanager.com/outlook/bcc.html Obtained from the internet (Sep. 1, 2010). 2004-2010, 2 pages.

(Continued)

*Primary Examiner* — Jude Jean Gilles
(74) *Attorney, Agent, or Firm* — DeLizio Gilliam, PLLC

(57) ABSTRACT

A computer system can implement a mechanism for email thread monitoring and automatic forwarding of related email messages. In one embodiment, a first email message is provided from an email application of a computer system to a plurality of email addresses. An indication is detected, at the email application, that a first email address of the plurality of email addresses is to be provided a copy of subsequent email messages associated with the first email message. Subsequent email messages received at, and transmitted by, the email application are monitored to determine whether one or more of the subsequent email messages are associated with the first email message. In response to determining that a second email message from the subsequent email messages is associated with the first email message, a copy of the second email message is automatically provided to the first email address of the plurality of email addresses.

20 Claims, 6 Drawing Sheets

(56) References Cited

U.S. PATENT DOCUMENTS

| | | | |
|---|---|---|---|
| 2003/0018722 A1* | 1/2003 | Almeda et al. | 709/206 |
| 2003/0018723 A1* | 1/2003 | Almeda et al. | 709/206 |
| 2005/0027779 A1 | 2/2005 | Schinner | |
| 2005/0100143 A1* | 5/2005 | Bedingfield, Sr. | 379/88.12 |
| 2005/0172213 A1* | 8/2005 | Ralston et al. | 715/500 |
| 2008/0059586 A1* | 3/2008 | Keohane et al. | 709/206 |
| 2008/0301245 A1* | 12/2008 | Estrada et al. | 709/206 |
| 2009/0259725 A1* | 10/2009 | Rabinovich | 709/206 |
| 2012/0110090 A1* | 5/2012 | Jensen et al. | 709/206 |

OTHER PUBLICATIONS

Kerr, Bernard et al., "Designing Remail: Reinventing the Email Client Through Innovation and Integration", *CHI 2004*, Apr. 24-29, 2004, Vienna, Austria. ACM 1-58113-703-06/0004. Apr. 24-29, 2004, 16 pages.

* cited by examiner

EMAIL THREAD MONITORING AND AUTOMATIC FORWARDING OF RELATED EMAIL MESSAGES

BACKGROUND

Embodiments of the inventive subject matter generally relate to the field of email communication systems, and, more particularly, to a mechanism for email thread monitoring and automatic forwarding of related email messages.

Electronic mail (or email) systems provide a means for individuals to communicate quickly and efficiently regardless of geographic location. Client email applications allow a user to send an email message to one or more primary email recipients, and provide a carbon copy ("Cc") of the email message to one or more secondary email recipients. Furthermore, client email applications allow the user to send a blind carbon copy ("Bcc") to one or more additional secondary email recipients. Typically, the primary and second email recipients can see all the email addresses of the other primary and secondary email recipients, with the exception of the email addresses that were sent a blind carbon copy. Each of the primary and secondary email recipients can reply to all the other email recipients (with the exception of the blind carbon copy email addresses that remain hidden), reply to a subset of the email recipients, and/or forward the email message to additional individuals. Typically, when an email message is replied to or forwarded by one or more of the email recipients, an email thread is created by the client email application adding or appending the original email message at the bottom of the new email message when creating the new email message. The email thread continues to grow as more email recipients reply to or forward the email thread, and therefore more email messages are appended to the email thread.

SUMMARY

Various embodiments for implementing email thread monitoring and automatic forwarding of related email messages to interested users are described herein. In one embodiment, a first email message is provided from an email application of a computer system to a plurality of email addresses. An indication is detected, at the email application, that a first email address of the plurality of email addresses is to be provided a copy of subsequent email messages associated with the first email message. Subsequent email messages received at the email application and transmitted by the email application are monitored, at the email application, to determine whether one or more of the subsequent email messages are associated with the first email message. In response to determining that a second email message from the subsequent email messages is associated with the first email message, a copy of the second email message is automatically provided to the first email address of the plurality of email addresses.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
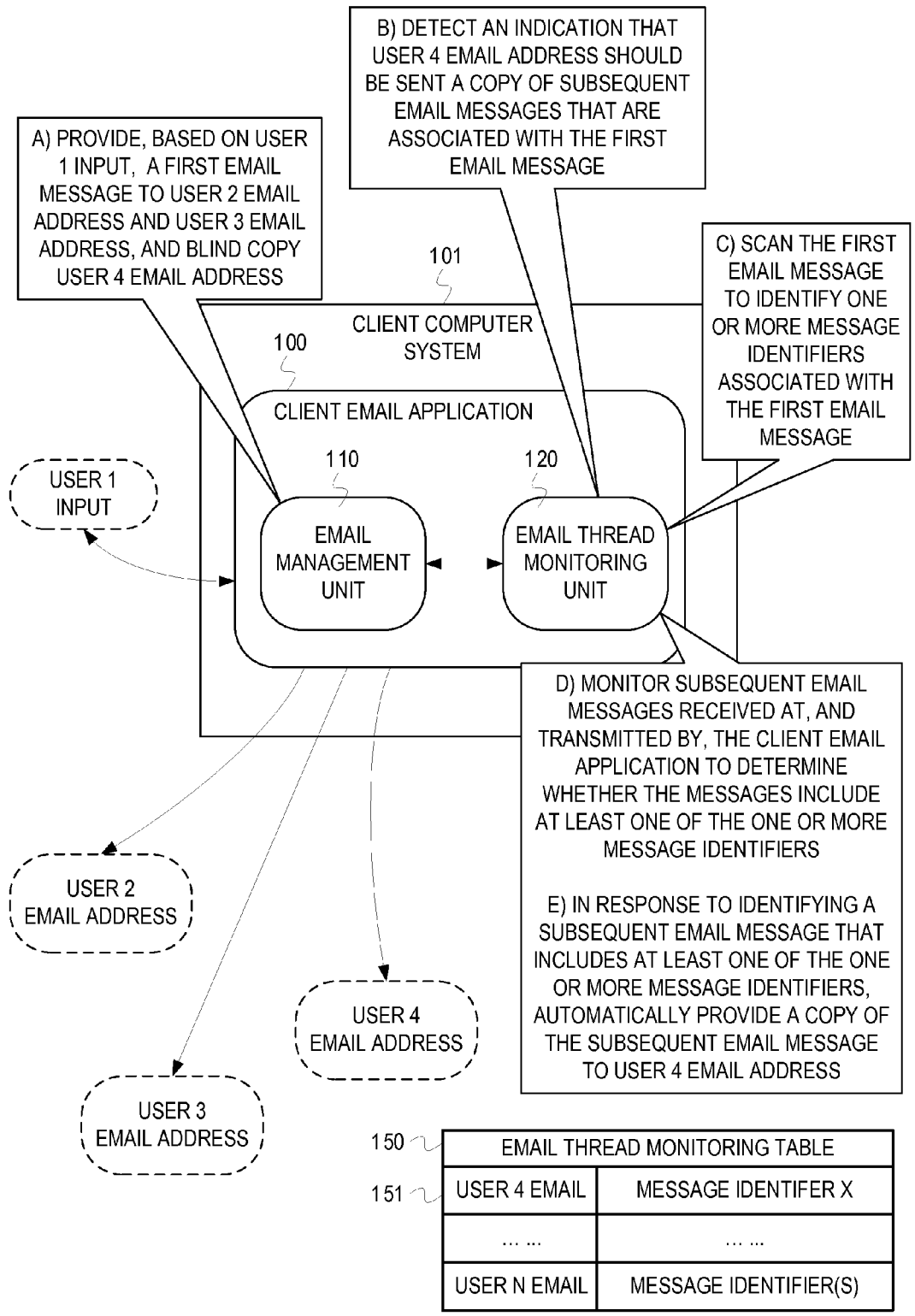
FIG. 1 is an example conceptual diagram illustrating example operations for monitoring email messages at a client computer system and automatically sending copies of related email messages to interested users, according to some embodiments.

The description that follows includes example systems, methods, techniques, instruction sequences and computer program products that embody techniques of the present inventive subject matter. However, it is understood that the described embodiments may be practiced without these specific details. For instance, some examples described herein refer to an email application monitoring subsequent email messages for an interested user that was blind copied with an original email message, and automatically providing a copy of any subsequent email messages that are related to the original email message to the interested user. However, in other implementations, operations described herein can also be implemented for other interested users that were sent or forwarded the original email message or the corresponding email thread, as will be further described below. In other instances, well-known instruction instances, protocols, structures and techniques have not been shown in detail in order not to obfuscate the description.

Secondary email recipients that are blind carbon copied ("blind copied") an email message, or email recipients that are forwarded the email message, typically do not have a practical way to follow a corresponding email thread that may be of interest to them. These email recipients may not have been included in the "To" or "Cc" fields of the email message, and therefore will usually not be sent replies to the email thread. One impractical option is for these email recipients to ask the originator of the email thread to continually forward (or send them a blind copy of) subsequent email messages associated with the email thread.

In some embodiments, functionality can be implemented in email systems to allow email recipients that are interested in a particular email thread to request authorization from the originator of the email thread to automatically receive subsequent email messages that are related to the email thread. If the originator of the email thread (or the user that originally forwarded the email message) grants the authorization request, the email system can continually monitor subsequent email messages to identify related email messages, and automatically provide a copy of the related email messages to the interested user(s). In some embodiments, a client email application on a client computer system (e.g., the computer system of the email thread originator) can monitor subsequent email messages and automatically forward related email messages to the interested user(s). In some embodiments, a server email application on a server computer system (e.g., that routes email messages to the intended email addresses) can perform the monitoring and automatic forwarding of related email messages to the interested user(s). The client-based and the server-based embodiments can utilize email message identifiers to detect related email messages, as will be further described below with reference to FIGS. 1-4. In other embodiments, an encrypted auto-copy file can be embedded to an email thread to automatically provide a copy of related email messages to the interested user(s) in a machine-independent manner, as will be further described below with reference to FIG. 5.

FIG. 1 is an example conceptual diagram illustrating example operations for monitoring email messages at a client computer system and automatically sending copies of related email messages to interested users, according to some embodiments. As shown in FIG. 1, a client computer system 101 can comprise a client email application 100. For example, the client email application 100 can be a client-based email program such as IBM® Lotus Notes® and Microsoft® Outlook®. The client email application 100 can include an email management unit 110 and an email thread monitoring unit 120. The email management unit 110 can communicate with one or more email servers to send and receive email messages. The email thread monitoring unit 120 can monitor email messages and automatically forward related email messages to interested users, as will be further described below.

At stage A, the client email application 100 of the computer system 101 provides, based on input from User 1, a first email message to an email address associated with User 2 ("User 2 email address") and an email address associated with User 3 ("User 3 email address"). In the same communication, the client email application 100 also blind copies the first email message to an email address associated with User 4 ("User 4 email address"). In one embodiment, the client email application 100 can cause the computer system 101 to present a graphical user interface, and User 1 may provide input via the graphical user interface of the email application 100 to create the first email message and to add the email addresses associated with User 2, User 3, and User 4 to the first email message. For example, User 1 may add the User 2 and User 3 email addresses in the "To" field of the first email message, and add the User 4 email address in the "Bcc" of the first email message. After User 1 provides input to send the first email message, the email management unit 110 of the email application 100 sends the first email message to the User 2, User 3, and User 4 email addresses. It is noted, however, that in other examples the first email message can be provided to User 4 in the same communication by adding the User 4 email address in any of the other email fields, such as the "To" field or the "Cc" field. Also, the first email message can be provided to User 4 in a separate communication by forwarding the first email message via a new email message.

At stage B, the client email application 100 detects an indication that the User 4 email address should be sent a copy of subsequent email messages that are associated with the first email message. In one embodiment, after User 1 blind copies the first email message to the User 4 email address, the client-based email application of User 4 provides User 4 the option to send an authorization request to an email address associated with User 1 ("User 1 email address"). The authorization request indicates that User 4 is interested in the subject matter of the first email message, and requests to be sent a copy of subsequent email messages that are associated with the first email message. For example, the graphical user interface of the client-based email application can offer a "follow" or "track" email option that the User 4 can select via the graphical user interface. When the User 4 selects the "follow" or "track" email option, the client-based email application of User 4 can send the authorization request to the User 1 email address. In one example, the authorization request can be an email message sent from the client-based email application of User 4 to the client-based email application of User 1. In response to receiving the authorization request email, the graphical user interface associated with the email management unit 110 of the client email application 100 provides User 1 the option to select whether to "approve" or "reject" the authorization request. It is noted, however, that the authorization request can be provided to User 1 by other techniques; for example, the authorization request can be another type of message sent from the client-based email application of User 4 that cause the client email application 100 associated with User 1 to provide User 1 the option to select whether to "approve" or "reject" the authorization request. In one embodiment, the email thread monitoring unit 120 can detect an indication of whether User 1 approves the authorization request received from User 4. For example, the email thread monitoring unit 120 can detect whether the User 1 selected the "approve" option in the graphical user interface. If the email thread monitoring unit 120 detects that the User 1 approves the authorization request, the email thread monitoring unit 120 creates and stores an indication to monitor subsequent email messages, and to send a copy of related email messages to User 4, as will be further described below. In some examples, the email application 100 can also send a notification message to the User 4 email address if the User 1 approves the authorization request. If the client email application 100 detects that User 1 rejects the authorization request received from User 4, then the client email application 100 can send a notification message to the User 4 email address indicating that User 1 rejected the authorization request. In some implementations, the client-based email application used by User 4 is the same client-based email program (or, if not the same, a compatible email program) as the client email application 100 used by User 1.

At stage C, the client email application 100 scans the first email message to identify one or more message identifiers associated with the first email message. In some embodiments, in response to detecting that User 1 approves the authorization request from User 4 to monitor subsequent email messages, the email thread monitoring unit 120 scans the first email message to determine one or more message identifiers associated with the first email message. The email thread monitoring unit 120 can associate the User 4 email address with the one or more message identifiers associated with the first email message and store the information in a table (or other type of data structure) maintained at the client computer system 101. For example, as shown in FIG. 1, the email thread monitoring unit 120 can create a new entry 151 in an email thread monitoring table 150 and store the User 4 email address and the associated message identifiers (e.g., the message identifier X). It is noted, however, if the first email message is an email thread comprising two or more email messages, the email thread monitoring unit 120 may detect multiple message identifiers when it scans the first email message, and therefore store multiple message identifiers in the table 150. In some embodiments, each message identifier can be a randomly generated number that is embedded within each email message (e.g., when the email message is created) to distinguish the email message from other email messages (and otherwise process and manage the message). The message identifiers can be randomly generated N-digit numbers, where N can be predefined (e.g., by the email protocol) and/or configurable. It is noted, however, that the message identifiers can be other suitable types of identifiers, e.g., randomly generated combination of numbers and letters, hexadecimal numbers, etc. The message identifiers can be visible (e.g., embedded in the subject line) or hidden (e.g., embedded as metadata) to the user. The new entry 151 in the email thread monitoring table 150 can register the interested user and define the criteria (i.e., the message identifier(s)) to determine which subsequent email messages are related email messages.

At stage D, the email thread monitoring unit 120 monitors subsequent email messages received at, and transmitted by, the client email application 100 to determine whether the subsequent email messages include the at least one of the one or more message identifiers associated with the first email message. The subsequent email messages that include the at least one of the one or more message identifiers associated with the first email message are considered to be related to the first email message. As described above, in one example, the one or more message identifiers associated with the first email message can comprise the message identifier X. In this example, the subsequent email messages that include the message identifier X can be an email thread that includes the first email message. In some embodiments, the email thread monitoring unit 120 scans each subsequent email message to determine whether the email message includes at least one of the one or more message identifiers associated with the first email message (i.e., the message identifier(s) stored in the table 150). For example, for each subsequent email message, the email thread monitoring unit 120 compares the message identifier(s) embedded in the email message to the message identifier X to determine whether the subsequent email message is related to the first email message. The subsequent emails can either be emails that the client email application 100 receives, or emails that the client email application is going to send out. When the client email application 100 receives a subsequent email message, the email thread monitoring unit 120 scans the received email message to determine whether it includes the message identifier X. When the client email application 100 is preparing to send out a subsequent email message (e.g., in response to the user selecting the reply or forward options), the email thread monitoring unit 120 scans the email message before the email message is sent out to determine whether it includes the message identifier X. If a subsequent email message includes the message identifier X, the email thread monitoring unit 120 automatically forwards a copy of the subsequent email message to User 4, as will be further described below.

At stage E, in response to identifying a subsequent email message that includes at least one of the one or more message identifiers associated with the first email message, the email thread monitoring unit 120 automatically provides a copy of the email message to the User 4 email address. For example, the subsequent email message can be an email thread received at the client email application 100 that includes the first email message (and, therefore, includes the message identifier X). In this example, the email thread monitoring unit 120 automatically forwards the email thread to the User 4 email address. In another example, the subsequent email message can be an email thread that the client email application 100 is going to send out, which includes the first email message. For instance, the subsequent email message can be an email thread that User 1 wants to forward or reply to certain email addresses. In this example, the email thread monitoring unit 120 can automatically provide a copy of the subsequent email message (that the client email application 100 is going to send out) to User 4. For example, the email thread monitoring unit 120 can automatically blind copy User 4 before sending out the email message. In another example, the email thread monitoring unit 120 can automatically send a copy of the email message to User 4 after the email message is sent out to the desired email addresses. Furthermore, in response to providing a copy of the subsequent email message to User 4, the email thread monitoring unit 120 scans the subsequent email message to identify one or more additional message identifiers associated with the subsequent email message that are embedded within the email thread (in addition to the message identifier X), as will be further described below with reference to FIG. 4. The email thread monitoring unit 120 then begins to monitor subsequent email messages for the one or more additional message identifiers in addition to the message identifier X.

Figure 2:
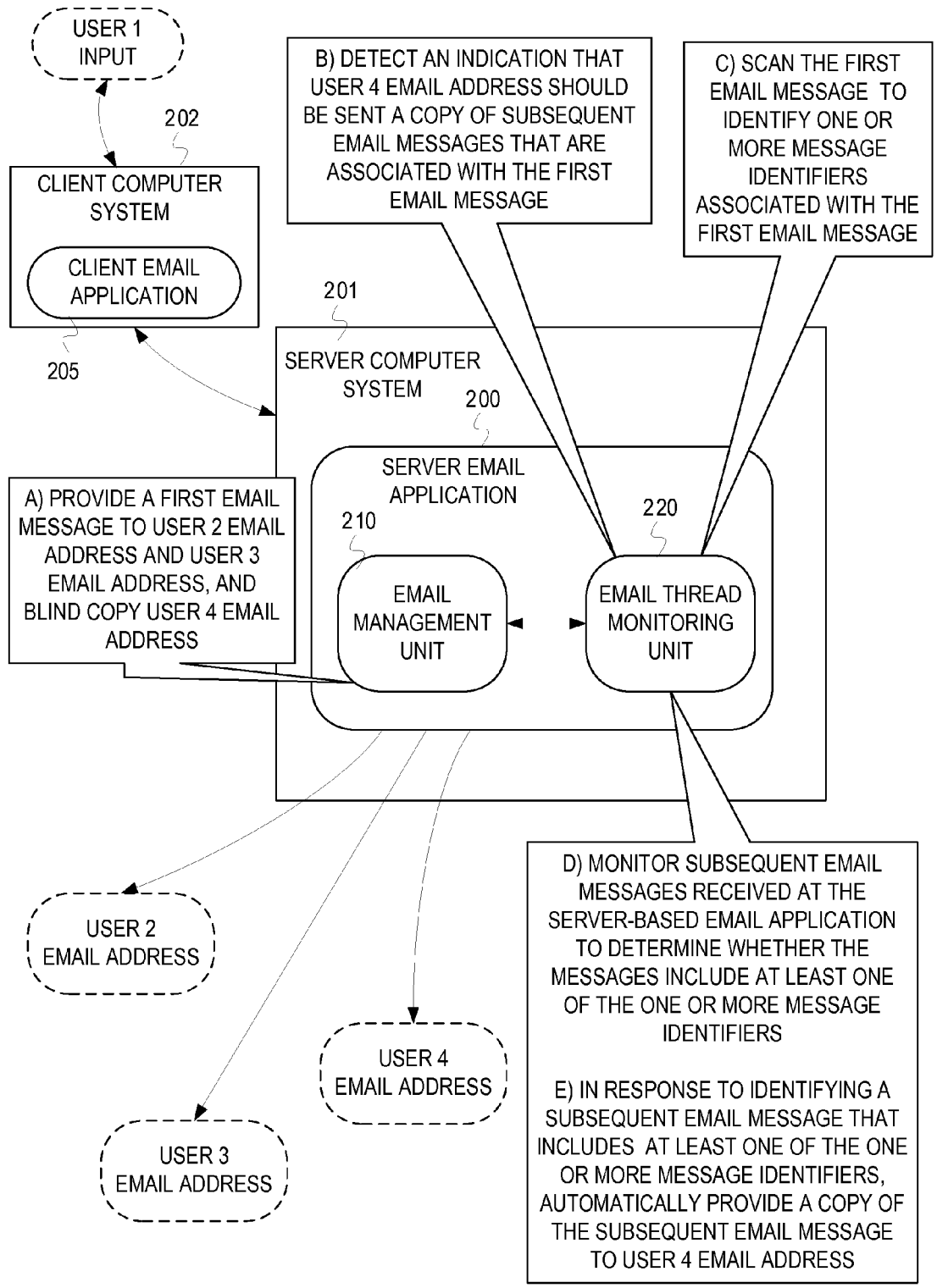
FIG. 2 is an example conceptual diagram illustrating example operations for monitoring email messages at a server system and automatically sending copies of related email messages to interested users, according to some embodiments.

FIG. 2 is an example conceptual diagram illustrating example operations for monitoring email messages at a server system and automatically sending copies of related email messages to interested users, according to some embodiments. As shown in FIG. 2, a server computer system 201 can comprise a server-based email application 200. For example, the server email application can be an email application on the server side that routes emails messages to the corresponding destination user mailboxes (within the same server, a different local server, or a different remote server) to store the email messages (e.g., for future retrieval by the users). The server email application can receive email messages from a client email application and route the email messages to the corresponding destination user mailboxes. The server email application may also receive and store email messages (e.g., created using browsers on the client side) for a web-based email server system, such as Yahoo!® Mail and Google® Mail. Similar to the embodiment described in FIG. 1, the server-based email application 200 can include an email management unit 210 and an email thread monitoring unit 220. The email management unit 210 can communicate with client computer systems (e.g., the client computer system 202 of User 1), and in some cases, with one or more additional email server systems, to route email messages to the destination user mailboxes. The email thread monitoring unit 220 can monitor email messages that are routed via the server email application 200 and automatically forward related email messages to interested users, as will be further described below.

At stage A, the server-based email application 200 of the computer system 201 provides a first email message to the User 2 email address and to the User 3 email address. In the same communication, the server-based email application 200 also blind copies the first email message to the User 4 email address. In one embodiment, the email management unit 210 of the email application 200 can receive the first email message from the client email application 205 client computer system 202 (e.g., created and sent by User 1) and route the first email message to the User 2, User 3, and User 4 email addresses. The first email message can be routed to the user email addresses in order to route the message to the corresponding destination user mailboxes associated with the user email addresses. As described above, the destination user mailboxes can be located within the same server, a different local server, or a different remote server, and are used to store the email messages (e.g., for future retrieval by the users).

At stage B, the server-based email application 200 detects an indication that the User 4 email address should be sent a copy of subsequent email messages that are associated with the first email message. As described above with reference to FIG. 1, User 4 may send an authorization request to User 1, and User 1 may either approve or reject the authorization request. In one embodiment, the email thread monitoring unit 220 of the server-based email application 200 can detect an indication of whether User 1 approves the authorization request from User 4. For example, the client email application 205 can provide an indication to the server-based email application 200 if User 1 approves the authorization request to monitor subsequent email messages. In one example, the email thread monitoring unit 220 can receive a notification message (e.g., one or more packets) indicating User 1 approved the authorization request from the client email application. In another example, for web-based email servers, the email thread monitoring unit 220 can receive an indication that User 1 approved the authorization request from a web browser of the client computer system 202 (instead of a client email application). In this embodiment, the monitoring of subsequent email messages that are related to the first email message takes place on the server side, instead of at the client side. Furthermore, in response to the email thread monitoring unit 220 detecting the indication that the User 1 approved the authorization request, the email thread monitoring unit 220 creates and stores an indication to monitor subsequent email messages and to send a copy of related email messages to User 4, as will be further described below. In some implementations, the server-based email application 200 can also send a notification message to the User 4 email address indicating whether User 1 approved or rejected the authorization request.

At stage C, the server-based email application 200 scans the first email message to identify one or more message identifiers associated with the first email message. Similarly as described above with reference to FIG. 1, the email thread monitoring unit 220 may scan the first email message to identify the one or more message identifiers. The email thread monitoring unit 220 may then associate the User 4 email address with the one or more message identifiers associated with the first email message and store the information in an email thread monitoring table (or other data structure) maintained at the server computer system 201 (e.g., a table similar to the email thread monitoring table 150 shown in FIG. 1). The new entry in the email thread monitoring table can register the interested user and define the criteria (i.e., the message identifier(s)) to determine which subsequent email messages are related email messages.

At stage D, the email thread monitoring unit 220 monitors subsequent email messages received at the server-based email application 200 to determine whether the subsequent email messages include at least one of the one or more message identifiers associated with the first email message. The subsequent email messages that include at least one of the one or more message identifiers associated with the first email message are considered to be related to the first email message. As described above, in one example, the one or more message identifiers associated with the first email message can comprise the message identifier X. In this example, the subsequent email messages that include the message identifier X can be an email thread that includes the first email message. In some embodiments, the email thread monitoring unit 220 scans each subsequent email message to determine whether the email message includes at least one of the one or more message identifiers associated with the first email message. For example, for each subsequent email message, the email thread monitoring unit 220 compares the message identifier(s) embedded in the email message to the message identifier X to determine whether the subsequent email message is related to the first email message. The email thread monitoring unit 220 can monitor and scan all subsequent email messages that are routed via the server computer system 201, regardless of whether User 1 is copied or not, and determine whether the messages are related to the first email message. If a subsequent email message includes the message identifier X, the email thread monitoring unit 220 automatically forwards a copy of the subsequent email message to User 4, as will be further described below.

At stage E, in response to identifying a subsequent email message that includes at least one of the one or more message identifiers associated with the first email message, the email thread monitoring unit 220 automatically provides a copy of the email message to the User 4 email address. For example, the subsequent email message can be an email thread received at the server-based email application 200 that includes the first email message (and, therefore, includes the message identifier X). In one implementation, the email thread monitoring unit 220 can automatically blind copy the User 4 email address, and then route the email message to the user email addresses. In another implementation, the email thread monitoring unit 220 can automatically send a copy of the email message to the User 4 email address after the email message is routed to the intended user email addresses. It is noted that, in the server-based embodiment, the subsequent emails that are related to the first email message can either be emails that the server-based email application 200 receives from User 1 (i.e., from the client computer system 202), or emails that the server-based email application 200 receives from other users (e.g., Users 2 and/or 3). The original email thread can be forwarded to other users without copying User 1, but the first email identifier will still be embedded within the email message. The email thread monitoring unit 220 can identify any email message that is routed via the server computer system 201 that includes the email identifier X (or other email identifiers associated with the original email thread). For example, if User 2 forwards an email message, which is part of the original email thread, to the User 3 email address, at least one of the message identifiers associated with the original email thread will be embedded in the email communication to the User 3 email address. Therefore, the server-based email application 200 can determine the email message sent to the User 3 email address is a related email message, and provide a copy of the email message to the User 4 email address. Furthermore, in response to providing a copy of the subsequent email message to User 4, the email thread monitoring unit 220 scans the subsequent email message to identify one or more additional message identifiers associated with the subsequent email message that are embedded within the email thread (in addition to the message identifier X), as will be further described below with reference to FIG. 4.

In both the client-based embodiment and the server-based embodiment, the email application can continue to monitor subsequent email messages (to determine if they are related to the original email message) until a default or configurable message monitoring time period expires. For example, the default time period can be 6 months. In some examples, users can customize the message monitoring time period; for example, User 1 can change the message monitoring time period from 6 months to one year. The users can also cause the email application to stop monitoring email messages prior to the expiration of the default or configurable time period. For example, User 1 can select an option in the graphical user interface associated with the client email application to terminate the monitoring of email messages. In another example, User 4 may provide a termination notification (e.g., via the graphical user interface) to the User 1 email address to stop the monitoring of the email messages. In the client-based embodiment, the client email application can remove the corresponding entry from the email thread monitoring table (e.g., table 150) in response to detecting an indication to stop monitoring the email messages. In the server-based embodiment, the server-based email application can receive an indication to stop monitoring the email messages either from User 1 or User 4. In response to receiving the indication to stop monitoring the email messages, the server-based email application can remove the corresponding entry from the email thread monitoring table.

In other embodiments of both client-based and server-based implementations, instead of continuing to scan email messages to determine the message identifiers related to the email thread, the client-based or server-based email application can embed or attach an encrypted auto-copy file (that is hidden to users) to the email thread. The encrypted auto-copy file can cause the corresponding email application to automatically forward a copy of related email message to the interested user (e.g., User 4), as will be further described below with reference to FIG. 5.

Figure 3:
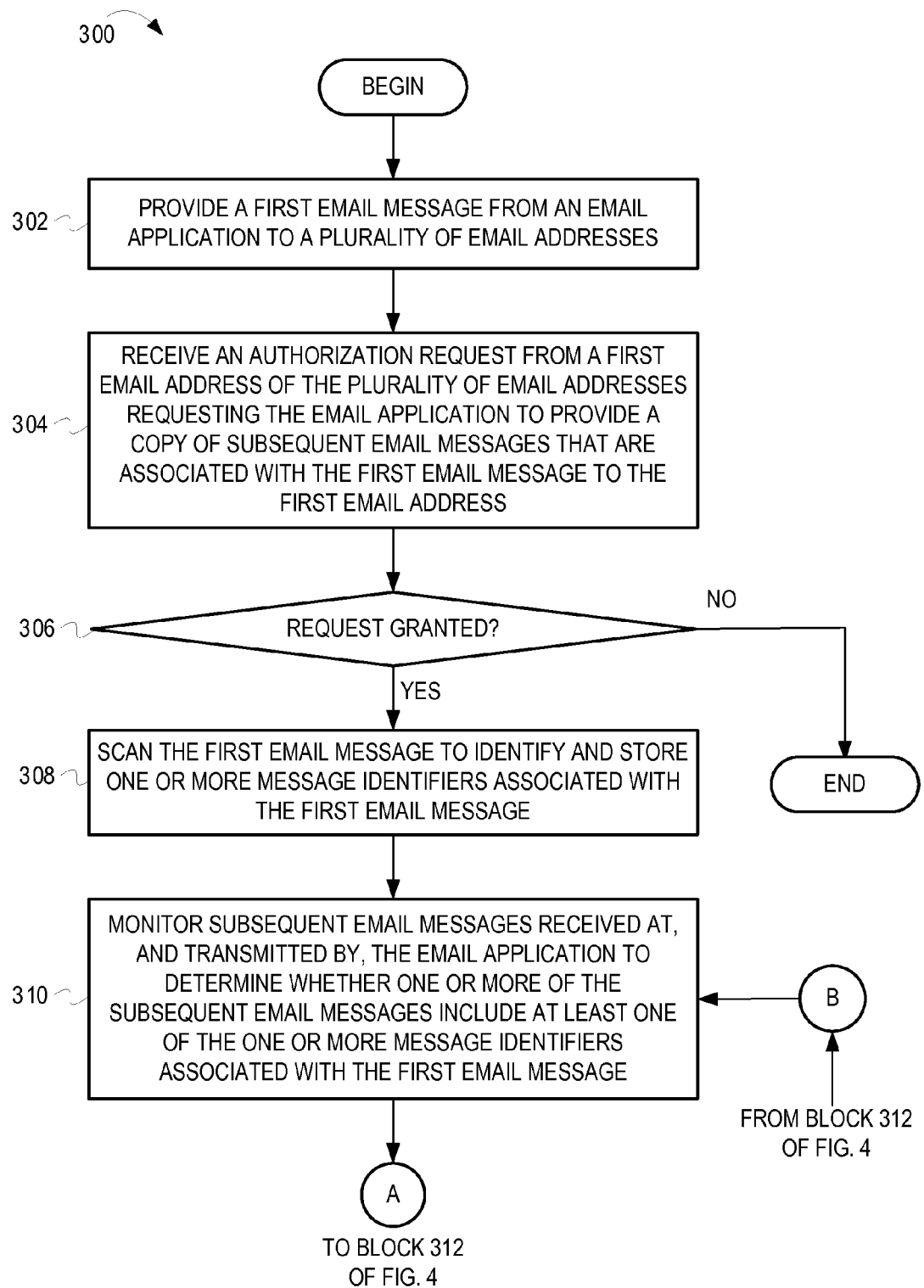
FIG. 3 is a flow diagram illustrating example operations for implementing email thread monitoring and automatic forwarding of related email messages to interested users, according to some embodiments.

FIG. 3 is a flow diagram ("flow") 300 illustrating example operations for implementing email thread monitoring and automatic forwarding of related email messages to interested users, according to some embodiments. The flow begins at block 302.

A first email message is provided from an email application to a plurality of email addresses (302). For example, in the client-based embodiment, client email application 100 of client computer system 101 provides the first email message (originating from User 1) to the User 2 email address and the User 3 email address, and blind copies the first email message to the User 4 email address. In another example, for the server-based embodiment, server email application 200 of server computer system 201 routes the first email message to the User 2 email address, the User 3 email address, and the User 4 email address. The flow continues at block 304.

An authorization request is received from a first email address of the plurality of email addresses requesting the email application to provide a copy of subsequent email messages that are associated with the first email message to the first email address (304). For example, in the client-based embodiment, client email application 100 receives the authorization request from the User 4 email address, and notifies User 1. In the server-based embodiment, server email application 200 receives the authorization request from the User 4 email address, and then provides the authorization request to the User 1 email address. The flow continues at block 306.

It is determined whether the authorization request is granted (306). For example, in the client-based embodiment, client email application 100 detects an indication of whether User 1 granted or rejected the authorization request. For example, client email application 100 detects an indication from the graphical user interface associated with client email application 100 of whether User 1 approved or rejected the authorization request. In the server-based embodiment, server email application 200 receives an indication (from the client email application associated with User 1) of whether User 1 accepted or rejected the authorization request. If the authorization request is not granted, the flow ends. Otherwise, if the authorization request is granted, the flow continues at block 308.

The first email message is scanned to identify and store one or more message identifiers associated with the first email message (308). For example, in both the client-based and the server-based embodiments, the corresponding email application scans the first email message to identify the one or more message identifiers embedded within the first email message. The email application then stores the email address of the interested user (e.g., the User 4 email address) and the one or more message identifiers associated with the first email message in a table (e.g., email thread monitoring table 150 shown in FIG. 1) or other data structure. The email address of the interested user is associated with the one or more message identifiers associated with the first email message. This information is used to register the User 4 email address and define the criteria by which the email application will monitor subsequent email messages and automatically forward related email messages. The flow continues at block 310.

Subsequent email messages received at, and transmitted by, the email application are monitored to determine whether one or more of the subsequent email messages include at least one of the one or more message identifiers associated with the first email message (310). For example, in both the client-based and the server-based embodiments, the corresponding email application scans each subsequent email message to identify the one or more message identifiers associated with the subsequent email message. The email application then compares the one or more message identifiers associated with the subsequent email message to the one or more message identifiers associated with the first email message. If the subsequent email message includes at least one of the one or more message identifiers associated with the first email message, the email application determines that the subsequent email message is related to the first email message, as will be further described below. The flow continues at block 312 of FIG. 4.

Figure 4:
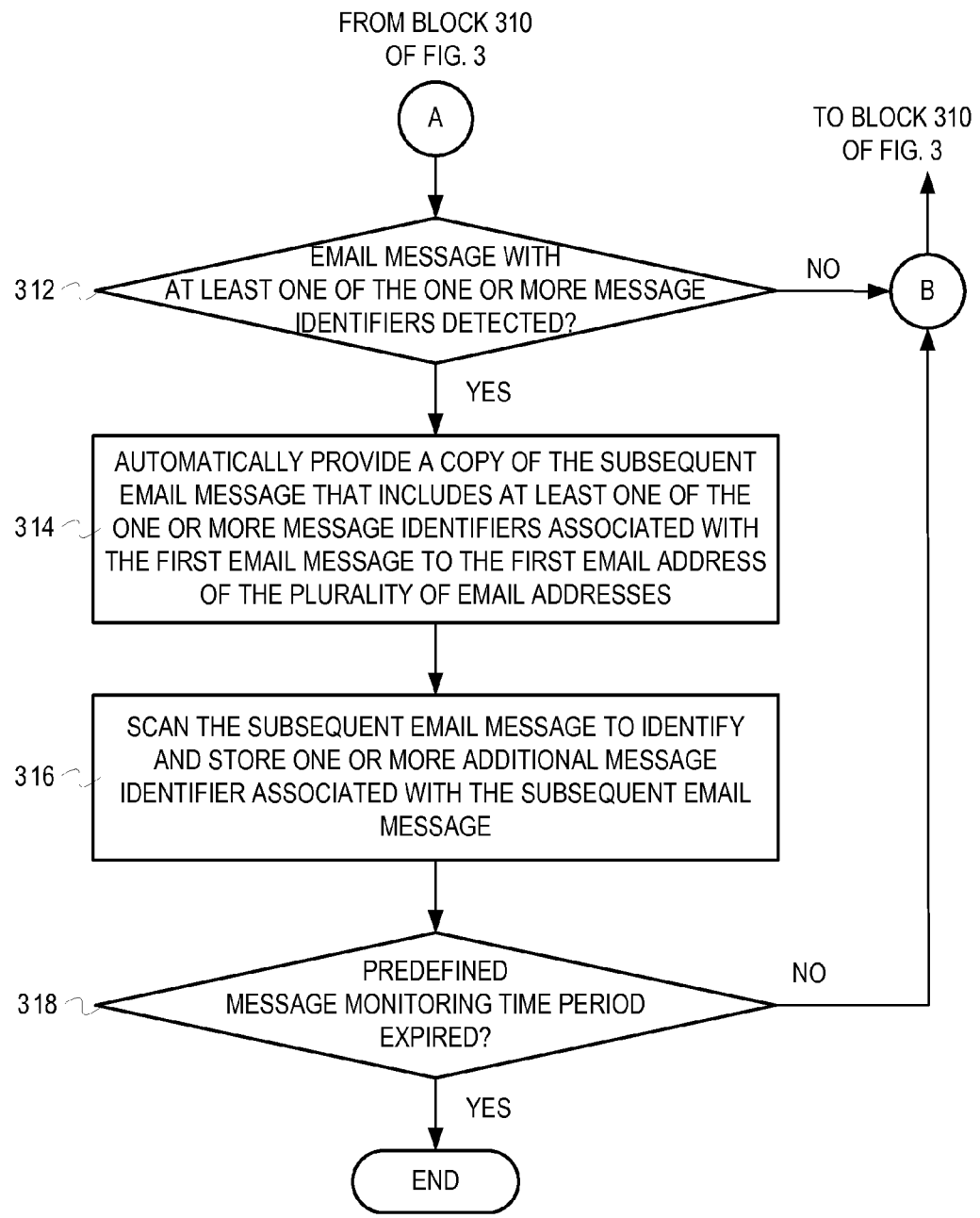
FIG. 4 is a flow diagram illustrating additional example operations for implementing email thread monitoring and automatic forwarding of related email messages in email communication systems, according to some embodiments.

FIG. 4 is a flow diagram illustrating additional example operations for implementing email thread monitoring and automatic forwarding of related email messages to interested users, according to some embodiments. The flow diagram of FIG. 4 is a continuation of the flow diagram shown in FIG. 3, and begins at block 312.

It is determined whether a subsequent email message is detected that includes at least one of the one or more message identifiers associated with the first email message (312). For example, in both the client-based and the server-based embodiments, the email application scans the subsequent email message and determines whether the subsequent email message includes at least one of the one or more message identifiers associated with the first email message. If the email application determines that the subsequent email message does not include at least one of the one or more message identifiers associated with the first email message, the flow loops back and continues at block 310, where the email application continues to monitor subsequent email messages. Otherwise, if the email application determines that the subsequent email message includes at least one of the one or more message identifiers associated with the first email message, the flow continues at block 314.

A copy of the subsequent email message that includes at least one of the one or more message identifiers associated with the first email message is provided to the first email address of the plurality of email addresses (314). For example, in the client-based embodiment, if client email application 100 received the subsequent email message that includes at least one of the one or more message identifiers associated with the first email message, client email application 100 forwards a copy of the subsequent email message to the email address of the interested user (e.g., the User 4 email address). If the subsequent email message is an email message client email application 100 is scheduled to send out, client email application 100 blind copies the email address of the interested user in the same email communication scheduled to be sent out. In another implementation, if the subsequent email message is an email message client email application 100 is scheduled to send out, client email application 100 forwards a copy of the subsequent email message to the email address of the interested user in a separate email communication. In the server-based embodiment, if the subsequent email message that includes at least one of the one or more message identifiers associated with the first email message is an email message server email application 200 received and routed to the corresponding email addresses, server email application 200 forwards a copy of the subsequent email message to the email address of the interested user (e.g., the User 4 email address). In both the client-based and the server-based embodiments, the corresponding email application may access email thread monitoring table 150 (or other data structure) to determine the email address of the interested user that is associated with the one or more message identifiers associated with the first email message. The flow continues at block 316.

The subsequent email message is scanned to identify and store one or more additional message identifiers associated with the subsequent email message (316). For example, in both the client-based and the server-based embodiments, the corresponding email application scans the subsequent email message that includes at least one of the one or more message identifiers associated with the first email message to identify one or more additional message identifiers that are embedded within the subsequent email message. In some embodiments, each time a new email message is created, a new message identifier is embedded within the new email message. If the new email is part of an email thread, the new email may have embedded one or more email identifiers associated with the previous emails that comprise the email thread, and also a new message identifier for the new email message. In one example, the subsequent email message may be an email thread that includes the first email message with the message identifier X, a second email message with a message identifier Y, and a third email message with a message identifier Z. In this example, after scanning the subsequent email message, the email application can determine that the message identifier Y and the message identifier Z are related to the email thread that comprises the first email message (and the message identifier X). Therefore, in this example, the email application can store the message identifier Y and the message identifier Z in the same table entry 151 of the email thread monitoring table 150. After the email application stores the message identifier Y and the message identifier Z and associates these message identifiers with the email address of the interested user (e.g., the User 4 email address), the email application can continue monitoring subsequent email messages according to the updated monitoring criteria. In other words, the email application can scan each subsequent email message to determine whether the message includes either the message identifier X, the message identifier Y, or the message identifier Z. If a subsequent email message includes either of these message identifiers, the email application can determine that the email message is related to the email thread associated with the first email message, and therefore provide a copy of the email message to the interested user. The flow continues at block 318.

It is determined whether a predefined message monitoring time period expired (318). For example, in both the client-based and server-based embodiment, the corresponding email application can determine whether the default or customized message monitoring time period has expired. The predefined message monitoring time period defines when to terminate the monitoring of subsequent email messages, and automatic forwarding of related email messages. If the predefined message monitoring time period has not expired, the flow loops back and continues at block 310 of FIG. 3, where the email application continues to monitor subsequent email messages. If the predefined message monitoring time period has expired, the flow ends.

Figure 5:
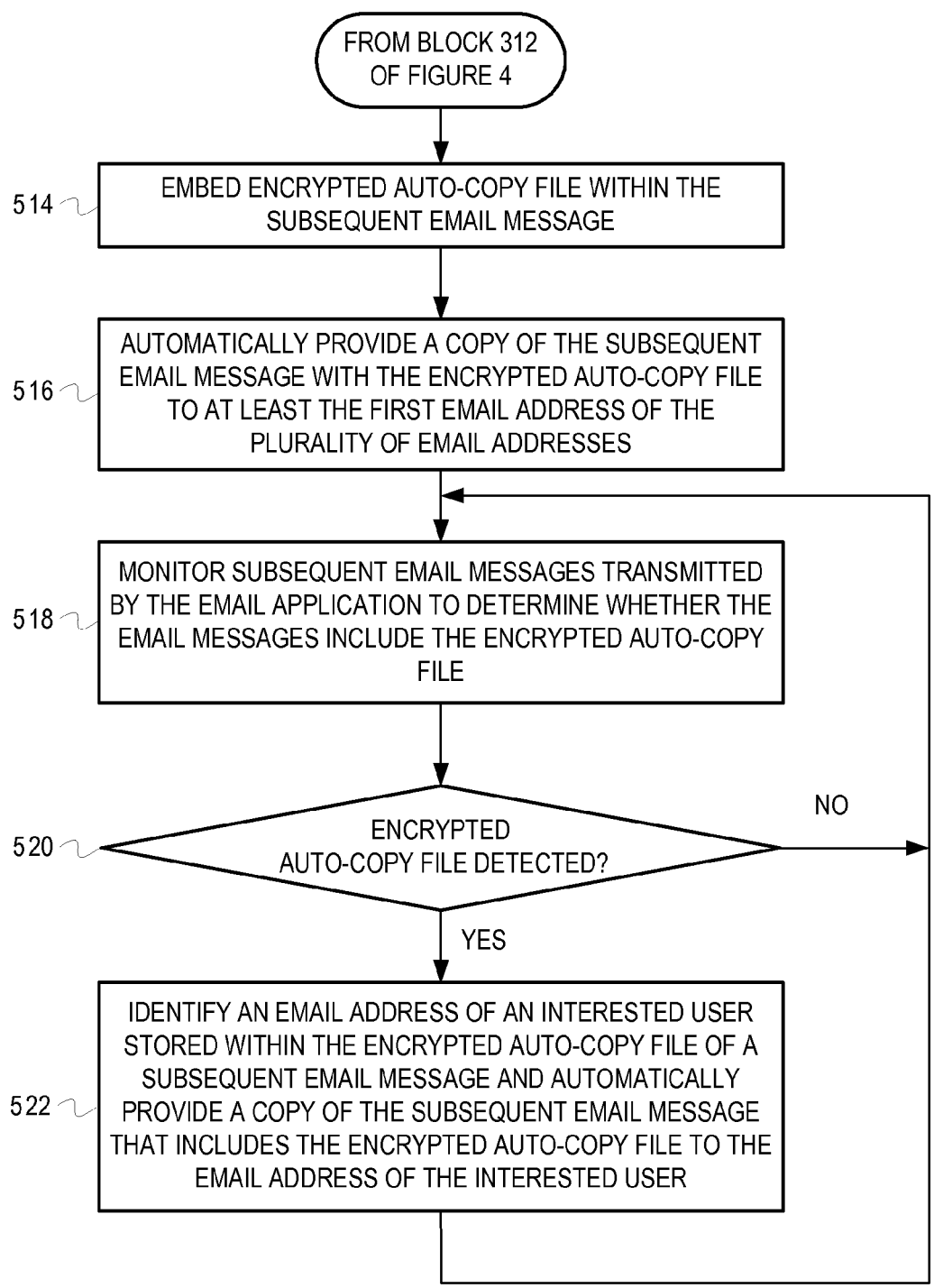
FIG. 5 is a flow diagram illustrating additional example operations for implementing email thread monitoring and automatic forwarding of related email messages to interested users, according to some embodiments.

FIG. 5 is a flow diagram illustrating additional example operations for implementing email thread monitoring and automatic forwarding of related email messages to interested users, according to some embodiments. The flow diagram of FIG. 5 may begin with the operations described above in blocks 302-312 of FIGS. 3 and 4, and then follow a different path of operations described below in blocks 514-522. After the "Yes" path of block 312 of FIG. 4, the flow continues at block 514.

In response to detecting a subsequent email message including at least one of the one or more message identifiers associated with the first email message, an encrypted auto-copy file is embedded in the subsequent email message (514). For example, in both the client-based and server-based embodiments, the email thread monitoring unit of the corresponding email application can embed the encrypted auto-copy file into the subsequent email message. The encrypted auto-copy file can be a file with text and/or code that causes an email application that is scheduled to send out an email message (with the encrypted auto-copy file) to automatically provide a copy of the email message to the email address of the interested user (e.g., the User 4 email address). The encrypted auto-copy file can also store the email address of the interested user (or in some cases two or more email addresses of interested users). By embedding the encrypted auto-copy file within the email thread, the monitoring and automatic forwarding of related email messages can be performed in a machine-independent manner (i.e., the process is both client-independent and server-independent). Furthermore, with this technique, the client or server computer system may not have to continue to track and store message identifiers of email messages after the encrypted auto-copy file is embedded to the email thread. In some embodiments, the encrypted auto-copy file can be an executable file, as will be further described below. The flow continues at block 516.

A copy of the subsequent email message with the encrypted auto-copy file is provided to at least the first email address of the plurality of email addresses (516). For example, in both the client-based and server-based embodiments, if the email application is preparing to send the subsequent email message to one or more intended email addresses (e.g., the User 2 and User 3 email addresses), the email application can automatically send the subsequent email message (with the encrypted auto-copy file) to the intended recipients, and also blind copy the email address of the interested user (e.g., the User 4 email address). In the client-based embodiment, if the client email application has received the subsequent email message, the client email application can automatically forward a copy of the subsequent email message (with the encrypted auto-copy file) to the email address of the interested user. At a later time, when the user that received the subsequent email message (e.g. User 1) decides to reply to the message, the client email application can also send the email message with the encrypted auto-copy file to the intended recipients.

After the subsequent email message with the embedded auto-copy file is sent out, the monitoring and automatic forwarding of subsequent related email messages is performed at any compatible email application (located in any geographic location) that is configured with the functionality to detect (and decrypt) the embedded auto-copy file, and automatically forward a copy of the email message to the email address of the interested user (stored within the embedded auto-copy file). For example, in a client-based embodiment, if User 2 sends the email message with the encrypted auto-copy file to an email address of a User 5, the client email application at the client computer system of User 2 can detect the email message includes the encrypted auto-copy file. After detecting the embedded auto-copy file, the client email application of User 2 obtains the User 4 email address (i.e., the email address of the interested user) that is stored within (or referenced by) the embedded auto-copy file, and then automatically blind copies the User 4 email address when sending out the email message to User 5 (since the process is machine-independent). If User 5 forwards a copy of the email thread to the email address of a User 6 (e.g., located in a different country), the client application of User 5 can detect the embedded auto-copy file and automatically blind copy the User 4 email address when sending out the email message to User 6. The monitoring and automatic forwarding of related email messages to the interested user can continue without involvement of the client email application of User 1 and without having to track message identifiers. This process can be similarly applied in a server-based embodiment. In a server-based embodiment, the monitoring and automatic forwarding can be implemented by any compatible server computer system that is involved in routing email messages worldwide, as long as the server computer system has the functionality to detect the embedded auto-copy file and automatically forward a copy of the email thread to the email address of the interested user. The flow continues at block 518.

Subsequent email messages transmitted by the email application are monitored to determine whether the email messages include the encrypted auto-copy file (518). After sending out the email message with the encrypted auto-copy file, the email application continues to monitor whether subsequent email message that are scheduled to be transmitted include the encrypted auto-copy file, or other encrypted auto-copy files associated with different interested users. The flow continues at block 520.

It is determined whether an embedded auto-copy file has been detected in a subsequent email message to be transmitted by the email application (520). If an embedded auto-copy file is not detected, the flow loops back to block 518 to continue monitoring subsequent email messages. Otherwise, if an embedded auto-copy file is detected, the flow continues at block 522.

An email address of an interested user stored within the encrypted auto-copy file is identified and a copy of the subsequent email message that includes the encrypted auto-copy file is provided to the email address of the interested user (522), in addition to the other intended recipients. The flow then loops back and continues at block 518.

In some embodiments, the encrypted auto-copy file can be an executable file that is executed when the email message is sent out (e.g., using a "forward" or "reply" email option). In other words, the trigger for execution of the encrypted auto-copy file is the user selecting one of the forward or reply options. For example, in response to detecting that the email message is going to be sent out, the encrypted auto-copy file is detected and executed. The encrypted auto-copy file can work in conjunction with the email application to provide a copy of the email message to the interested user. For example, when the encrypted auto-copy file is executed, it can detect and communicate with the email application, and provide the email address of the interested user to the email application. The email application can then blind copy the email address of the interested user to provide a copy of the email message (or otherwise forward the email message) to the interested user. In some implementations, the auto-copy file can be a Dynamic HTML (DHTML) or an Ajax (Asynchronous JavaScript and XML) file embedded in an HTML email message. Furthermore, as described above, in some embodiments, the encrypted auto-copy file can be text file that includes the email address of the interested user (or in some cases two or more email addresses of interested users). In one example, the text file may be embedded in an email message that an email application is scheduled to send out. In response to detecting the embedded text file (e.g., during email scan), the email application can read the email address of the interested user and automatically provide a copy of the email message to the email address of the interested user.

It should be understood that the depicted diagrams (FIGS. 1-5) are examples meant to aid in understanding embodiments and should not be used to limit embodiments or limit scope of the claims. Embodiments may perform additional operations, fewer operations, operations in a different order, operations in parallel, and some operations differently. In other embodiments, when the originator of the email thread receives an authorization request from an interested user to provide a copy of subsequent email messages that are associated with the email thread (e.g., as described with reference to FIG. 3), the originator of the email tread may have other options besides accepting or rejecting the authorization request. In one example, the originator of the email thread may conditionally accept to forward related email messages to the interested user based on the message identifiers and one or more additional conditions. For example, besides including one or more message identifiers that are associated with the email thread, subsequent email message may be scanned to determine whether the email messages include certain keywords or phrases to determine whether to forward the messages to the interested user. In one example, the keywords or phrases may be provided to the originator of the email thread in the original authorization request. In another example, after receiving the authorization request, the originator of the email thread may send a response message indicating that the authorization request will be conditionally accepted as long as the interested user specifies certain keywords or phrases. In other embodiments, the originator of the email thread may only accept the authorization request if at least a majority of the email addressees associated with the email thread accept the request. For example, in response to receiving the authorization request, the originator of the email thread can forward the request to all the email addressees associated with the email thread to accept or reject the request. In other implementations, the originator of the email thread may only accept the authorization request if all of the email addressees associated with the email thread accept the request.

As will be appreciated by one skilled in the art, aspects of the present inventive subject matter may be embodied as a system, method, or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
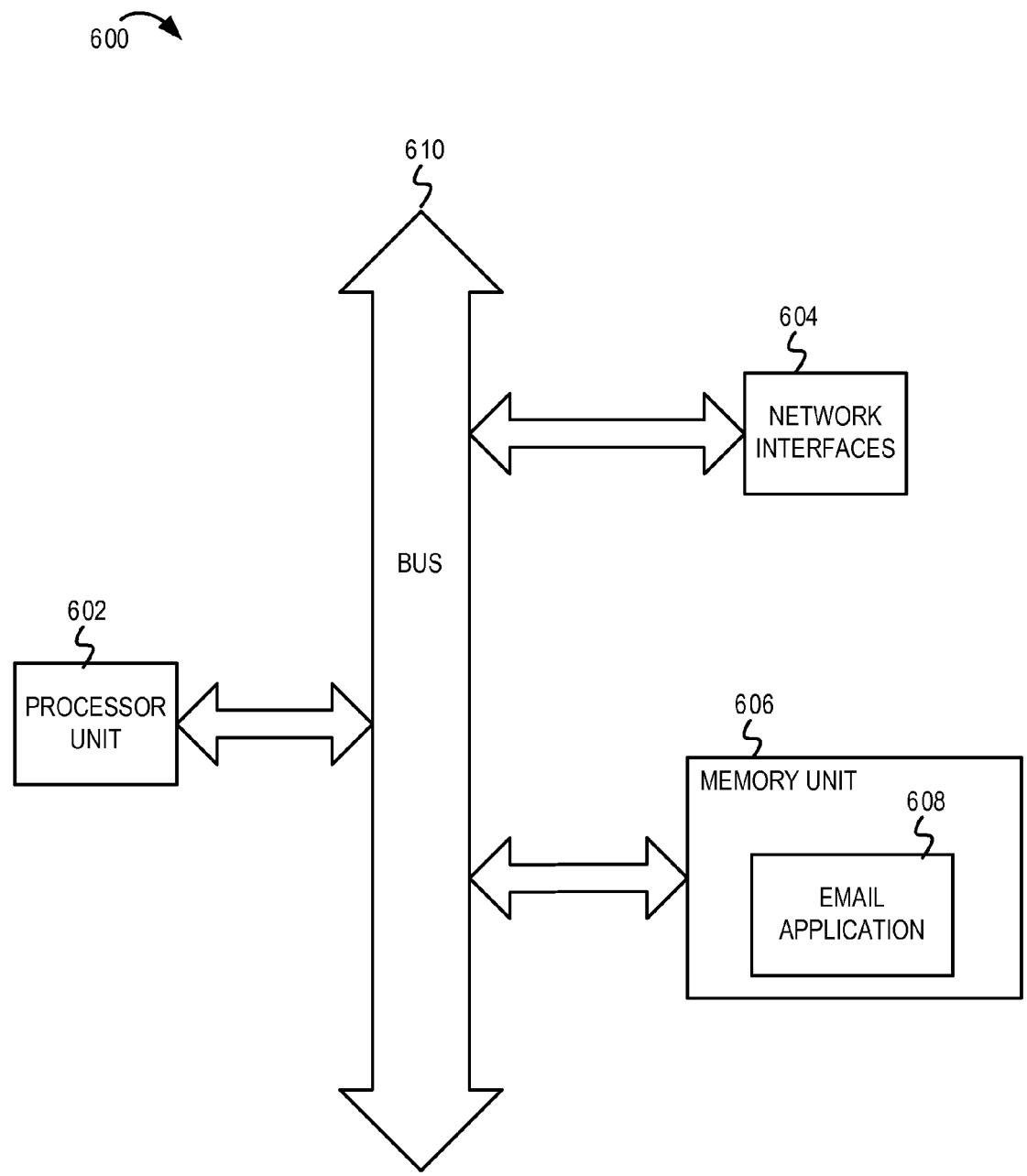
FIG. 6 is a block diagram of one embodiment of a computer system including a mechanism for implementing email thread monitoring and automatic forwarding of related email messages to interested users, according to some embodiments.

FIG. 6 is a block diagram of one embodiment of a computer system 600 including a mechanism for implementing email thread monitoring and automatic forwarding of related email messages to interested users, according to some embodiments. In some examples, the computer system may be a personal computer, a laptop, a mobile phone, a workstation, a server, or other machine that can communicate and exchange email messages in a client-server network. The computer system 600 includes a processor unit 602 (possibly including multiple processors, multiple cores, multiple nodes, and/or implementing multi-threading, etc.). The computer system 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 600 also includes a bus 610 (e.g., PCI, ISA, PCI-Express, HyperTransport, InfiniBand, NuBus, AHB, AXI, etc.), and network interfaces 604 that include at least one wireless and/or wired network interface (e.g., a WLAN interface, a Bluetooth® interface, a WiMAX interface, a ZigBee® interface, a Wireless USB interface, USB interface, Ethernet interface, etc.). The memory unit 606 embodies functionality to implement embodiments described above. For example, the memory unit 606 may comprise an email application 608 (a client-based email application or a server-based email application) that implements the functionality described above with reference to FIGS. 1-5.

Any one of these functionalities may be partially (or entirely) implemented in hardware and/or on the processor unit 602. For example, the functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, the memory unit 606, and the network interfaces 604 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the inventive subject matter is not limited to them. In general, techniques for implementing email thread monitoring and automatic forwarding of related email messages as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer-implemented method comprising:
providing a first email message from an email application of a computer system to a plurality of email addresses;
detecting, at the email application, an indication that a first email address of the plurality of email addresses is to be provided a copy of subsequent email messages associated with the first email message;
monitoring, at the email application, subsequent email messages received at the email application and transmitted by the email application to determine whether one or more of the subsequent email messages are associated with the first email message; and
in response to determining that a second email message from the subsequent email messages is associated with the first email message, automatically providing a copy of the second email message to the first email address of the plurality of email addresses.

2. The computer-implemented method of claim 1, wherein the email application of the computer system comprises a client-based email application of a client computer system or a server-based email application of a server computer system.

3. The computer-implemented method of claim 1, wherein said detecting, at the email application, the indication that the first email address of the plurality of email addresses is to be provided a copy of subsequent email messages associated with the first email message comprises:
receiving, at a client email application of a client computer system, an authorization request from the first email address of the plurality of email addresses;
determining, at the client email application, whether the authorization request is granted; and
in response to determining that the authorization request is granted, detecting, at the client email application, the indication that the first email address of the plurality of email addresses is to be provided the copy of subsequent email messages associated with the first email message.

4. The computer-implemented method of claim 1, wherein said detecting, at the email application, the indication that the first email address of the plurality of email addresses is to be provided a copy of subsequent email messages associated with the first email message comprises:
detecting, at a server email application of a server computer system, an indication of whether an authorization request from the first email address of the plurality of email addresses is granted at a client email application associated with an originator of the first email message; and
in response to detecting an indication that the authorization request is granted, detecting, at the server email application, the indication that the first email address of the plurality of email addresses is to be provided the copy of subsequent email messages associated with the first email message.

5. The computer-implemented method of claim 1, further comprising:
in response to detecting, at the email application, the indication that the first email address of the plurality of email addresses is to be provided a copy of subsequent email messages associated with the first email message, scanning the first email message to identify one or more message identifiers associated with the first email message.

6. The computer-implemented method of claim 5, further comprising:
associating the first email address and the one or more message identifiers associated with the first email message; and
storing the first email address and the one or more message identifiers associated with the first email message in an email thread monitoring data structure associated with the email application of the computer system to define a criteria for monitoring subsequent email messages.

7. The computer-implemented method of claim 5, wherein said monitoring, at the email application, subsequent email messages received at the email application and transmitted by the email application to determine whether one or more of the subsequent email messages are associated with the first email message comprises:
scanning each subsequent email message to identify one or more message identifiers associated with the subsequent email message;
comparing each of the one or more message identifiers associated with the subsequent email message to the one or more message identifiers associated with the first email message to determine whether the subsequent email message includes at least one of the one or more message identifiers associated with the first email message; and
in response to determining that the subsequent email message includes at least one of the one or more message identifiers associated with the first email message, determining that the subsequent email message is associated with the first email message.

8. The computer-implemented method of claim 7, wherein said determining that the subsequent email message is associated with the first email message comprises:
associating the first email address and the one or more message identifiers of the subsequent email message; and
storing the first email address and the one or more message identifiers of the subsequent email message in an email thread monitoring data structure associated with the email application of the computer system to define a criteria for monitoring subsequent email messages.

9. The computer-implemented method of claim 5, wherein said automatically providing the copy of the second email message to the first email address of the plurality of email addresses, in response to determining that the second email message from the subsequent email messages is associated with the first email message, comprises:
in response to determining that the second email message from the subsequent email messages includes at least one of the one or more message identifiers associated with the first email message, automatically providing the copy of the second email message to the first email address of the plurality of email addresses by forwarding the second email message to the first email address or by blind copying the first email address when sending the second email message.

10. The computer-implemented method of claim 1, wherein said providing the first email message from the email application of the computer system to the plurality of email addresses comprises one of:

sending the first email message from a client email application of a client computer system to the plurality of email addresses; or sending the first email message from a server email application of a server computer system to route the first email message to the plurality of email addresses.

11. The computer-implemented method of claim 1, further comprising:

in response to detecting, at the email application, the indication that the first email address of the plurality of email addresses is to be provided a copy of subsequent email messages associated with the first email message, scanning the first email message to identify one or more message identifiers associated with the first email message; and in response to determining that the second email message from the subsequent email messages includes at least one of the one or more message identifiers associated with the first email message, embedding an encrypted auto-copy file within the second email message that causes email applications that transmit an email thread associated with the first and second email messages to automatically provide a copy of the email thread to the first email address of the plurality of email addresses;

if the second email message is one of the subsequent email messages that is to be transmitted by the email application, transmitting the second email message with the embedded encrypted auto-copy file to one or more intended email addresses, and providing a copy of the second email message to the first email address of the plurality of email addresses; and if the second email message is one of the subsequent email messages that is received by the email application, and it is determined that the email thread associated with the first and second email messages is to be transmitted by the email application to one or more intended email addresses, transmitting the email thread with the embedded encrypted auto-copy file to the one or more intended email addresses, and providing a copy of the email thread to the first email address of the plurality of email addresses.

12. The computer-implemented method of claim 11, further comprising:

monitoring email messages subsequent to the second email message that are transmitted by the email application to determine whether the subsequent email messages include the encrypted auto-copy file; and if a third email message from the subsequent email messages to be transmitted by the email application includes the encrypted auto-copy file, transmitting the third email message with the embedded encrypted auto-copy file to one or more intended email addresses, and providing a copy of the third email message to the first email address of the plurality of email addresses.

13. A computer system comprising:
a processor;
a network interface coupled with the processor;

a email management unit coupled with the processor and the network interface, the email management unit operable to provide a first email message to a plurality of email addresses; and an email thread monitoring unit coupled with the processor and the network interface, the email thread monitoring unit operable to, detect an indication that a first email address of the plurality of email addresses is to be provided a copy of subsequent email messages associated with the first email message;

monitor subsequent email messages received at the email management unit and transmitted by the email management unit to determine whether one or more of the subsequent email messages are associated with the first email message; and in response to the email thread monitoring unit determining that a second email message from the subsequent email messages is associated with the first email message, automatically provide a copy of the second email message to the first email address of the plurality of email addresses.

14. The computer system of claim 13, wherein the computer system is a client computer system, and the email thread monitoring unit operable to detect the indication that the first email address of the plurality of email addresses is to be provided a copy of subsequent email messages associated with the first email message comprises the email thread monitoring unit operable to:

receive an authorization request from the first email address of the plurality of email addresses;

determine whether the authorization request is granted; and in response to the email thread monitoring unit determining that the authorization request is granted, detect the indication that the first email address of the plurality of email addresses is to be provided the copy of subsequent email messages associated with the first email message.

15. The computer system of claim 13, wherein the computer system is a server computer system, and the email thread monitoring unit operable to detect the indication that the first email address of the plurality of email addresses is to be provided a copy of subsequent email messages associated with the first email message comprises the email thread monitoring unit operable to:

detect an indication of whether an authorization request from the first email address of the plurality of email addresses is granted at a client email application associated with an originator of the first email message; and in response to the email thread monitoring unit detecting an indication that the authorization request is granted, detect the indication that the first email address of the plurality of email addresses is to be provided the copy of subsequent email messages associated with the first email message.

16. The computer system of claim 13, wherein the email thread monitoring unit is further operable to:

in response to the email thread monitoring unit detecting the indication that the first email address of the plurality of email addresses is to be provided a copy of subsequent email messages associated with the first email message, scan the first email message to identify one or more message identifiers associated with the first email message.

17. The computer system of claim 16, wherein the email thread monitoring unit operable to monitor subsequent email messages received at the email management unit and transmitted by the email management unit to determine whether one or more of the subsequent email messages are associated with the first email message comprises the email thread monitoring unit operable to:

scan each subsequent email message to identify one or more message identifiers associated with the subsequent email message;

compare each of the one or more message identifiers associated with the subsequent email message to the one or more message identifiers associated with the first email message to determine whether the subsequent email message includes at least one of the one or more message identifiers associated with the first email message; and in response to the email thread monitoring unit determining that the subsequent email message includes at least one of the one or more message identifiers associated with the first email message, determine that the subsequent email message is associated with the first email message.

18. A computer program product for implementing email message monitoring and automatic forwarding of related email messages, the computer program product comprising:

a non-transitory computer readable storage medium having computer readable program code embodied therewith, the computer readable program code configured to, provide a first email message from an email application of a computer system to a plurality of email addresses;

detect an indication that a first email address of the plurality of email addresses is to be provided a copy of subsequent email messages associated with the first email message;

monitor subsequent email messages received at the email application and transmitted by the email application to determine whether one or more of the subsequent email messages are associated with the first email message; and in response to determining that a second email message from the subsequent email messages is associated with the first email message, automatically provide a copy of the second email message to the first email address of the plurality of email addresses.

19. The computer program product of claim 18, wherein the computer readable program code is further configured to:

in response to detecting the indication that the first email address of the plurality of email addresses is to be provided a copy of subsequent email messages associated with the first email message, scan the first email message to identify one or more message identifiers associated with the first email message.

20. The computer program product of claim 19, wherein the computer readable program code configured to monitor subsequent email messages received at the email application and transmitted by the email application to determine whether one or more of the subsequent email messages are associated with the first email message comprises the computer readable program code configured to:

scan each subsequent email message to identify one or more message identifiers associated with the subsequent email message;

compare each of the one or more message identifiers associated with the subsequent email message to the one or more message identifiers associated with the first email message to determine whether the subsequent email message includes at least one of the one or more message identifiers associated with the first email message; and in response to determining that the subsequent email message includes at least one of the one or more message identifiers associated with the first email message, determine that the subsequent email message is associated with the first email message.

\* \* \* \* \*